C. R. ALLEN.
VEHICLE TOP SUPPORT.
APPLICATION FILED MAY 9, 1914
1,374,627.
Patented Apr. 12, 1921.
2 SHEETS—SHEET 1.
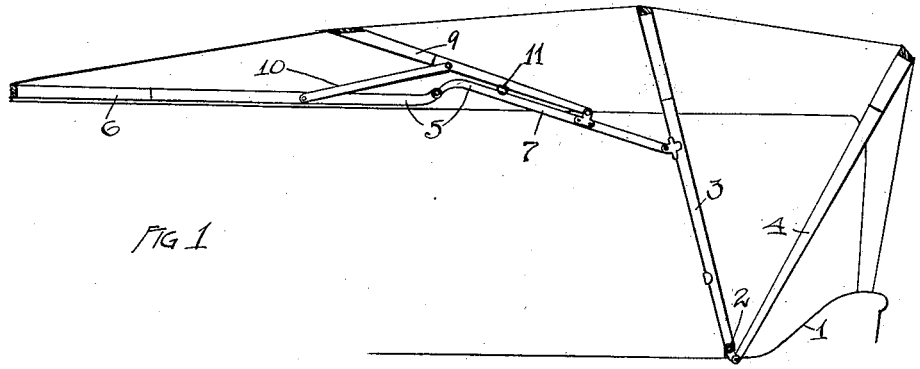
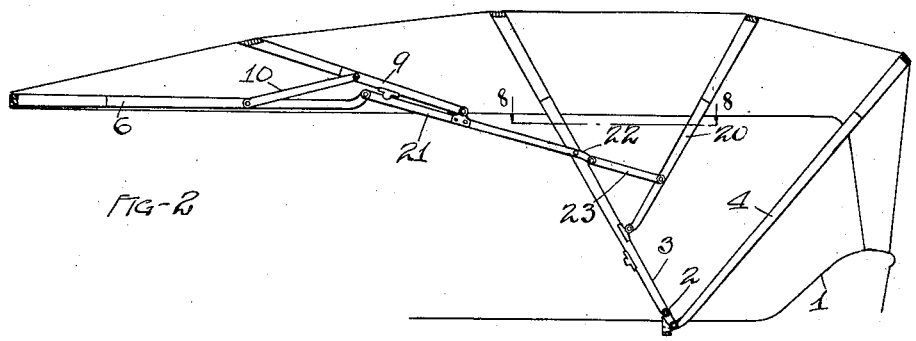
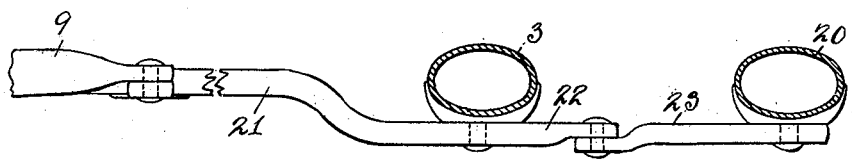
Witnesses=
O. M. Kappler
H. B. Fay
Inventor
Charles R. Allen
BY Fay & Oberlin
Attorneys

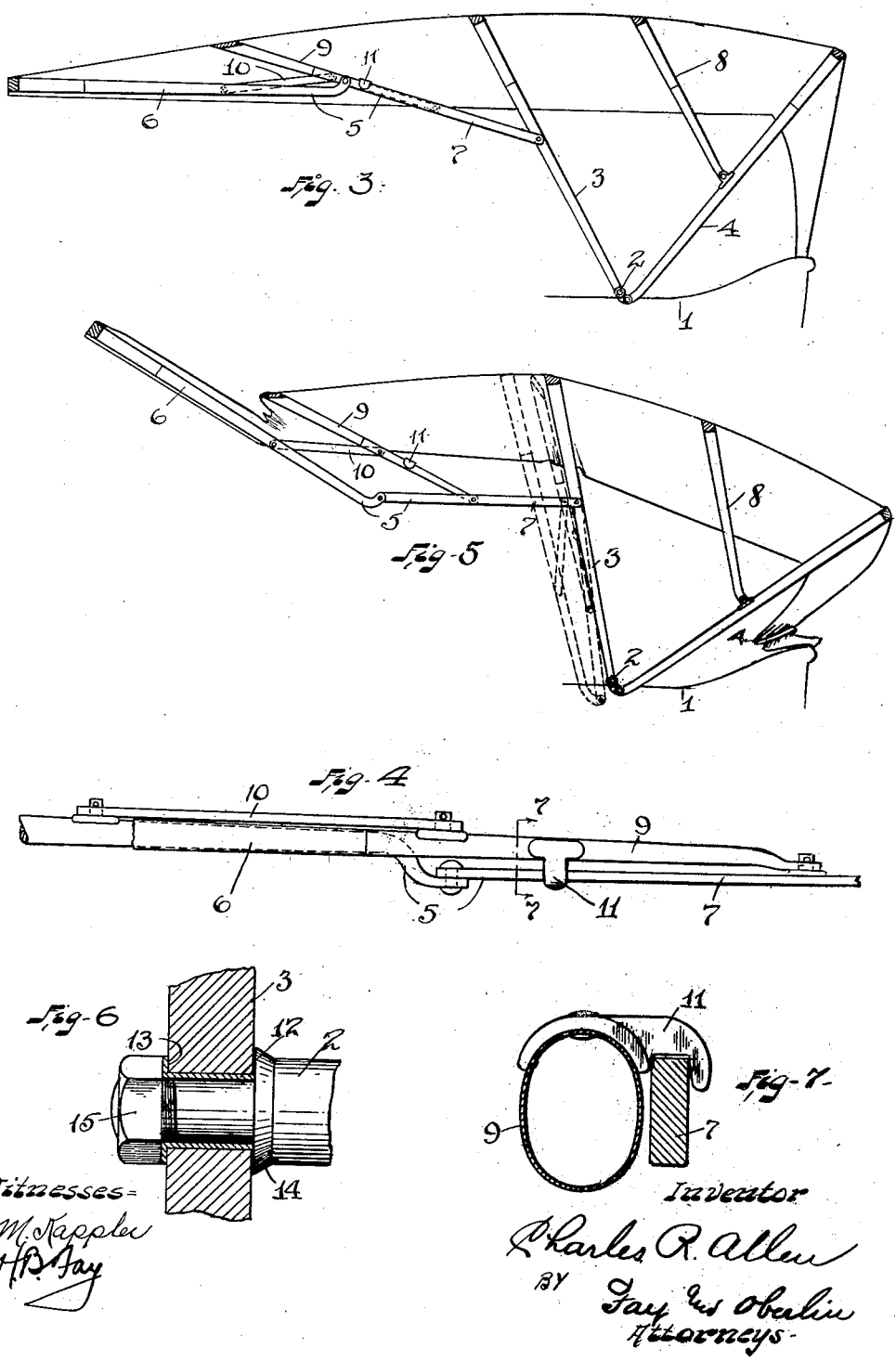

UNITED STATES PATENT OFFICE.

CHARLES R. ALLEN, OF ASHTABULA, OHIO, ASSIGNOR TO THE ASHTABULA BOW SOCKET COMPANY, OF ASHTABULA, OHIO, A CORPORATION OF OHIO.

VEHICLE-TOP SUPPORT.

1,374,627.  Specification of Letters Patent.  Patented Apr. 12, 1921.

Application filed May 9, 1914. Serial No. 837,356.

*To all whom it may concern:*

Be it known that I, CHARLES R. ALLEN, a citizen of the United States, and a resident of Ashtabula, county of Ashtabula, and State of Ohio, have invented a new and useful Improvement in Vehicle-Top Supports, of which the following is a specification, the principle of the invention being herein explained and the best mode in which I have contemplated applying that principle, so as to distinguish it from other inventions.

The present improvement relating in general to vehicle tops of the folding type, deal more particularly with the arrangement and connection of the bows which form the skeleton or support for the top covering. The present invention deals with vehicle tops of the type now generally known among the trade as "one man tops," this type involving the support of the bows of the frame from a single point on each side of the vehicle, usually adjacent to the rear of the body of the same, the forward end of the top being then suitably braced from the bows attached to the rear end of the vehicle body. This type of tops has become recently very popular, since it eliminates all vertical bows from the forward part of the vehicle body thus facilitating entrance and exit from the front seat and clearing the view for the occupants of the same. Another advantage is the neat appearance of the top when raised, and in fact the only disadvantage to be found with this type of construction is the difficulty of rendering the framework or skeleton rigid, particularly that portion which extends forwardly and is supported solely from the rear bows. Although this type of tops is popularly supposed to be easily folded, such is not always the case, and in many instances considerable difficulty is experienced in manipulating this kind of tops. The present invention has been designed to eliminate these difficulties without added complication or expense of construction. To the accomplishment of the foregoing and related ends, said invention, then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1 is a longitudinal section through the preferred simple form of my improved vehicle top; Fig. 2 is a similar view of an elaborated construction embodying, however, the same features that are shown in Fig. 1; Fig. 3 is a similar view of a second modification; Fig. 4 is an enlarged plan view of a portion of the auxiliary bow in Fig. 3 with the supplemental bow attached thereto; Fig. 5 is a view of the top shown in Fig. 3, when partially folded; Fig. 6 is a section through the bolt on which the main bow is pivoted; Fig. 7 is a section on the line 7—7, Fig. 4; and Fig. 8 is an enlarged section on the line 8—8, in Fig. 2.

In Fig. 1, I illustrate the preferred simple form of my invention, the top there shown being designed for use on small vehicles where the length of the extending portion is not great, such for example as upon touring cars of short wheel base. In this top I provide a main bow 3 pivotally mounted upon a bolt 2 attached to the body 1 of a vehicle. Such main bow is, in its raised position, substantially vertical, and to the lower end of the same there is pivotally attached a rear bow 4. Pivotally attached to the main bow 3 are two forwardly extending arms 7 to the outer ends of which is attached an auxiliary, or as it is sometimes called, an outrigger bow 6. The bow 6 and the arms 7 together constitute what is generally termed an articulated auxiliary bow 5. Pivotally attached to the arms 7, intermediate the ends of the same, is an intermediate or supplemental bow 9, such bow lying substantially parallel with the arms 7 in the raised position of the top and being provided with lugs 11 that in such position are adapted to laterally engage the arms 7. Links 10, pivotally attached at their respective ends to the bow 6 and to the bow 9, serve to connect the latter for a purpose that will be explained presently.

In Figs. 3 and 5, I show a slightly different construction, in that the supplemental bow 9 is pivoted on the outside of the arms 7, being maintained parallel therewith by the lugs 11 which are similar to those in the first-described construction except they offset a trifle in order to fit over the arms 7. In this type the main bow 3 is inclined forwardly at a greater angle to the vertical than in such first described form of the top and in order to support the top covering between the main and rear bows a second supplemental bow 8 is pivoted on the rear bow 4. Links 10, for connecting the outrigger bow 6 with the supplemental bow 9, are also desirably used, as before.

In Fig. 2, I illustrate a still further elaborated type of the present invention, for while I use the usual main bow 3 attached to the body in the manner indicated in Figs. 3 and 5, I also provide, pivotally attached to the main bow 3, not only the rear bow 4 but a rearwardly extending supplemental bow 20. Moreover, in this construction, the arms 21, which correspond to the arms 7 in the preceding figure, not only are pivotally attached to the main bow 3, but extend slightly beyond the same to the rear and are curved downwardly a trifle, and to such curved extending ends 22 of said arms 21 I attach links 23 which are pivotally attached to the supplemental bow 20. Otherwise the construction in this top is identical with that in the other figures, the same forwardly extending supplemental bow 9 being used, to which are pivotally attached braces 10 connecting with the auxiliary bow 6, while lugs 11 on the supplemental bow 9 cause the latter to interengage with the arms 21 in the extended condition of the top. It will be understood that wherever I hereinafter refer to the arms 7, such reference includes also the arms 21 of the top shown in Fig. 2, the last-named members having all the functions of the arms 7 and being designated by a separate reference numeral merely because of the slight difference in construction on account of their connection to the links 23.

In all of the foregoing, the arms 7 (or 21), the bow 6 and the bow 9 constitute, in the raised, or fully opened position of the top, a rigid truss which forms a firm support for the top covering and effectually prevents movement of one of said members relative to the others; for, when the top is in raised position, the attachment of the forward end of the bow 6 to the vehicle body (usually through the wind-shield), causes a longitudinal rearward thrust by this bow against the front end of the arms 7 (or 21). The latter members are thus forced upwardly against the bow 9, but such last-named bow is held in its position by the tension across the top covering between the same and bow 6. As a result, the bows 6 and 9 and arms 7 (or 21) are interlocked together, constituting a rigid truss supporting the forward portion of the top.

In order to fold either of the above described forms of the present top, it is first necessary to detach the connections between the outer portion 6 of the auxiliary bow 5 and the vehicle, and to raise the same slightly which will swing downwardly the arms 7 forming the rear portion of the auxiliary bow 5 until such portion lies parallel with the main bow. The forward portion 6 of the auxiliary bow is swung upward until it, too, lies parallel with the main bow 3 and with the arms 7, or 21, as the case may be. The function of the links 10 is to cause the swinging of the supplemental bow 9 into a similar parallel position with the main bow upon such movement of the two parts of the auxiliary bow. The bows will then lie in the position indicated by the dotted lines in Fig. 5, the arms 7 lying parallel with and in front of the main bow 3, the supplemental bow 9 lying in front of and parallel with the arms 7 and the forward portion 6 of the auxiliary bow 5 lying in front of and parallel with the supplemental bow 9, the forward portion of the auxiliary bow being permitted to lie in this position by reason of the curved end of the same as indicated.

In order to fold the top shown in Fig. 2, it is only necessary to detach and thereupon to raise slightly the extreme outer end of the bow 6. This will press downward the outer ends of the arms 21, and such movement of the arms 21 will in turn throw upwardly the joint between the ends 22 and the links 23, thus tending to bring together bows 3 and 20. The bow 20 is, however, prevented from moving toward the bow 3 by reason of the tension across the back of the top covering, and consequently this action will result in the swinging of the bow 3 toward the bow 20. Thus by the time the arms 21 are swung into a position parallel with the main bow 3 the latter will have been moved into a position parallel with the bow 20. In the same way the tension across the top between the bows 3 and 9 prevents the bow 9 from dropping while the links 10 maintain the bows in parallel position with arms 21 and bow 3. The operator is thus relieved of all handling of the bows except for the movement which must be given to the bow 6, the movement of the other parts automatically resulting therefrom.

This particular construction is preferable in relatively long tops where it is often very difficult for a single operator to fold the top, even when the latter is constructed along the lines of the present so-called "one-man top." The present top is automatic in its action, except for the single movement which the operator must give the bow 6, movement of the bow 6 causing the bows to automatically aline themselves and to move toward the folded position of the top.

It will be seen that this type of construction permits of a certain degree of rigidity in the forward portion of the top, since the thrust of the forward portion 6 of the auxiliary bow 5 tends to swing the rear portion 7 upwardly around the point of attachment of the latter to the main bow 3. This tendency is, of course, resisted by the combined weights of the rear portion of this bow, and the supplemental bow 9 and by the tension of the top covering between the supplemental bow and the forward end of the auxiliary bow.

In folding a top of this general type, the main bow 3 and the rear bow 4 tend to remain in their normal positions during the folding of the forwardly extending auxiliary and supplemental bows and if this is the case the outer ends of the braces 7 are apt to strike against the body 1 of the vehicle when the brace is swung down into its position parallel with the main bow since the length of the brace is greater than the distance between the point of attachment of the brace to the main bow and the point of pivotal attachment of the latter on the body. In order to prevent this action and to facilitate the folding of the main and rear bows, I have extended the end of the main bow 3 below the point of attachment 2 of the same and have attached to such extending end the rear bow 4. Upon the tension across the top covering being lessened upon the detachment of the front end of the bow and the body, the weight of the rear bow acts upon the extending end of the main bow and tends to swing the latter rearwardly about its point of pivotal attachment on the body, as shown in full lines in Fig. 5. The weight of such rear bow 4 and supplemental bow 8 is sufficient to swing the main bow 2 into a position which will permit of the folding of the braces 7 parallel to the main bow without striking the body of the vehicle. Moreover, this arrangement eliminates the necessity for the operator handling either the main or rear bows, the latter automatically folding down into the closed position of the top upon the operator's folding down the forward bows.

The bracket or bolt upon which the main bow is pivoted is provided with a bushing 12 having a disk 13 upon its outer end and between this disk 13 and a collar 14 formed on the bolt the main bow is adapted to be received, the holding nut 15 then being screwed up tightly against such bushing. In this way the fastening can be made very secure, since the nut can be screwed down tightly without clamping the main bow or making the same difficult to operate. This is desirable in the present construction since it is necessary for the main bow to swing freely into its folded position in order that the comparatively light weight of the rear bow will so operate the main bow when it is desired to fold the top.

Particular attention is directed to those features of my invention which permit of the present unique folding action and which secure a truss-like rigidity of the frame when in raised position. No difficulty is experienced in raising or lowering the present top, the lowering action in particular following automatically upon the raising of the forward end of the bow 6 as already described.

Other modes of applying the principle of my invention may be employed instead of the one explained; change being made as regards the mechanism herein disclosed, provided the means stated by any of the following claims or the equivalent of such stated means be employed.

I therefore particularly point out and distinctly claim as my invention:—

1. In a vehicle top, the combination of a main bow pivotally attached to the vehicle body, the lower end of said bow extending below and to the rear of the point of such attachment in the raised position of the top, a rear bow pivotally attached to such extending end of said main bow, an articulated auxiliary bow pivotally attached to said main bow, and a supplemental bow attached to the rear portion of said auxiliary bow, said auxiliary and supplemental bows being adapted to interengage when said top is in raised position so as to form a rigid truss.

2. In a vehicle top, the combination of an outstanding bracket attached to the body of the vehicle, a main bow pivotally attached to said bracket the lower end of said bow extending below and to the rear of the point of such attachment in the raised position of the top, a rear bow pivotally attached to such extending end of said main bow, an articulated auxiliary bow pivotally attached to said main bow, a supplemental bow pivotally attached to the rear portion of said auxiliary bow, and a link connecting the forward portion of said main bow with said supplemental bow, said auxiliary and supplemental bows being adapted to interengage when said top is in raised position so as to form a rigid truss.

3. In a vehicle top, the combination of a main bow pivotally attached to the body of the vehicle, a rearwardly extending supplemental bow pivotally attached to said main bow, a forwardly extending articulated auxiliary bow pivoted to said main bow, said auxiliary bow having one end extending to the rear of said main bow, a supplemental bow attached to the inner portion of said articulated bow and adapted to interengage therewith, a link connecting said rearwardly extending end of said auxiliary bow and said first-named supplemental bow, and another link connecting said second supplemental bow with the outer portion of said articulated bow.

4. In a vehicle top, the combination of a main bow suitably attached to the vehicle body, an articulated auxiliary bow pivotally attached to said main bow, and a supplemental bow pivotally attached to the inner portion of said auxiliary bow and adapted to interengage therewith, substantially as described.

5. In a vehicle top, the combination of a main bow pivotally attached to the vehicle body, an articulated auxiliary bow pivotally attached to said main bow, and a supplemental bow pivotally attached to the inner portion of said auxiliary bow and provided with lugs adapted to laterally engage therewith in the extended condition of the top.

6. In a vehicle top, the combination of a main bow pivotally attached to the vehicle body, an articulated auxiliary bow pivotally attached to and wholly supported by said main bow, a supplemental bow pivotally attached to the inner portion of said auxiliary bow, and links connecting said supplemental bow with the outer portion of said auxiliary bow.

7. In a vehicle top, the combination of a main bow pivotally attached to the vehicle body, an articulated auxiliary bow pivotally attached to said main bow, a supplemental bow pivotally attached to the inner portion of said auxiliary bow and provided with lugs adapted to laterally engage therewith in the extended condition of the top, and links connecting said supplemental bow with the outer portion of said auxiliary bow.

8. In a vehicle top, the combination of a main bow suitably attached to the vehicle body, an articulated auxiliary bow pivotally attached to said main bow, the outer portion of said auxiliary bow forming an angle on its lower side with the inner portion of said bow in the extended condition of the latter, thereby causing the longitudinal rearward thrust of the outer portion to tend to raise the inner portion upwardly, and a supplemental bow pivotally attached to the inner portion of said auxiliary bow and adapted to interengage therewith, said supplemental bow being maintained in such engaging position by the tension of the top covering between the same and the outer portion of said auxiliary bow, the two portions of said auxiliary bow and said supplemental bow thereby constituting a rigid truss supporting the forward end of the top covering.

9. In a vehicle top, the combination of a main bow suitably attached to the vehicle body, an articulated auxiliary bow pivotally attached to said main bow, the outer portion of said auxiliary bow forming an angle on its lower side with the inner portion of said bow in the extended condition of the latter, thereby causing the longitudinal rearward thrust of the outer portion to tend to raise the inner portion upwardly, a supplemental bow pivotally attached to the inner portion of said auxiliary bow and adapted to interengage therewith, said supplemental bow being maintained in such engaging position by the tension of the top covering between the same and the outer portion of said auxiliary bow, the two portions of said auxiliary bow and said supplemental bow thereby constituting a rigid truss supporting the forward end of the top covering, and a link connecting the outer end of said auxiliary bow and said supplemental bow, said link being adapted to move said supplemental bow into a position parallel with said main bow upon folding of said top.

10. In a vehicle top, the combination of a main bow suitably attached to the vehicle body, a supplemental bow pivotally attached to said main bow and extending rearwardly from the same, an articulated auxiliary bow pivotally attached to said main bow and extending forwardly from the same, a second supplemental bow pivotally attached to the inner portion of said auxiliary bow and adapted to interengage therewith, a link connecting the outer portion of said auxiliary bow and said second supplemental bow, said auxiliary bow extending rearwardly of said main bow, and a second link connecting such rearwardly extending portion of said auxiliary bow and said first supplemental bow.

11. A vehicle top provided with a main bow, an arm pivoted thereto, an outrigger bow pivoted to the forward end of the arm, and adapted to form therewith an upwardly extending elbow, an intermediate bow pivoted to the arm back of the elbow, and means on the intermediate bow for bearing on the arm and preventing an upward breaking of the elbow.

12. In a vehicle top, the combination of a forwardly extending main bow, a rearwardly extending main bow, a rearwardly extending supplemental bow pivotally attached to said forwardly extending main bow so as to lie between the same and said rearwardly extending main bow, a forwardly extending articulated auxiliary bow also pivotally attached to said forwardly extending main bow, said auxiliary bow having one end extending to the rear of said main bow, a supplemental bow attached to said auxiliary bow, and a link conecting such rearwardly extending end of said auxiliary bow with said first-named supplemental bow.

13. In a vehicle top, the combination of a forwardly extending main bow pivotally attached to the body of the vehicle, a rearwardly extending main bow pivotally attached to said first-named bow adjacent its lower end, a rearwardly extending supplemental bow pivotally attached to said forwardly extending main bow at a point approximately midway between the ends of the latter so as to lie between the same and said rearwardly extending main bow, a forwardly extending articulated auxiliary bow also pivotally attached to said forwardly extending main bow, said auxiliary bow having one end extending to the rear of said main bow, a supplemental bow attached to said auxiliary bow, and a link connecting such rearwardly extending end of said auxiliary bow with said first-named supplemental bow.

14. In a vehicle top, the combination of a forwardly extending main bow, a rearwardly extending main bow, a rearwardly extending supplemental bow pivotally attached to said forwardly extending main bow at a point approximately midway between the ends of the latter so as to lie between the same and said rearwardly extending main bow, a forwardly extending articulated auxiliary bow also pivotally attached to said forwardly extending main bow, the rear portion of said auxiliary bow having an end extending to the rear of said main bow, a supplemental bow attached to such rear portion of said auxiliary bow, a link operatively connecting such last-named supplemental bow with the front portion of said auxiliary bow, and another link connecting such rearwardly extending end of said auxiliary bow with said first-named supplemental bow.

15. In a vehicle top, the combination of a support pivotally attached to the body of the vehicle and adapted to incline forwardly in the open position of the top, a rearwardly extending supplemental bow pivotally attached to said support so as to lie with its upper end substantially directly over the point of attachment of said support to the vehicle body when the top is open, a forwardly extending articulated auxiliary bow also pivotally attached to said support, and link and lever means connecting said auxiliary bow with said supplemental bow, whereby said two last named bows are caused to move in unison toward and from said support.

16. In a vehicle top, the combination of a support pivotally attached to the body of the vehicle and adapted to incline forwardly in the open position of the top, a rearwardly extending supplemental bow pivotally attached to said support so as to lie with its upper end substantially directly over the point of attachment of said support to the vehicle body when the top is open, a forwardly extending articulated auxiliary bow also pivotally attached to said support, and link and lever means connecting the rear end of said auxiliary bow with said supplemental bow, whereby said two last named bows are caused to move in unison toward and from said support.

17. In a vehicle top, the combination of a support pivotally attached to the body of the vehicle and adapted to incline forwardly in the open position of the top, a rearwardly extending supplemental bow pivotally attached to said support so as to lie with its upper end substantially directly over the point of attachment of said support to the vehicle body when the top is open, a forwardly extending articulated auxiliary bow also pivotally attached to said support, said auxiliary bow having one end extending to the rear of said support to form a lever, and a link connecting such lever with said supplemental bow.

18. In a vehicle top, the combination of a support pivotally attached to the body of the vehicle and adapted to incline forwardly in the open position of the top, a rearwardly extending main bow pivotally attached to said support near its lower end, a rearwardly extending supplemental bow pivotally attached to said support at a point approximately midway between its lower end and the cover so as to lie between said support and rearwardly extending main bow, a forwardly extending articulated auxiliary bow also pivotally attached to said support, and link and lever means connecting said auxiliary bow with said supplemental bow, whereby said two last named bows are caused to move in unison toward and from said support.

19. In a vehicle top, the combination of a support pivotally attached to the body of the vehicle and adapted to incline forwardly in the open position of the top, a rearwardly extending main bow pivotally attached to said support near its lower end, a rearwardly extending supplemental bow pivotally attached to said support at a point approximately midway between its lower end and the cover so as to lie between said support and rearwardly extending main bow, a forwardly extending articulated auxiliary bow also pivotally attached to said support, said auxiliary bow having one end extending to the rear of said support to form a lever, and a link connecting such lever with said supplemental bow.

20. In a top for vehicles and the like, the combination of a support pivotally attached to the body of the vehicle and adapted to incline relatively thereto in the open position of the top, a supplemental bow pivotally attached to said support and inclining relatively thereto so as to lie with its upper end substantially directly over the point of attachment of said support to the vehicle body when the top is thus open, a horizontally extending articulated auxiliary bow pivotally attached to one of the two previously mentioned bows, and link and lever means connecting said auxiliary bow with the other of said two previously mentioned bows.

21. In a top for vehicles and the like, the combination of a support pivotally attached to the body of the vehicle and adapted to incline relatively thereto in the open position of the top, a supplemental bow pivotally attached to said support and inclining relatively thereto so as to lie with its upper end substantially directly over the point of attachment of said support to the vehicle body when the top is thus open, a horizontally extending articulated auxiliary bow pivotally attached to one of the two previously mentioned bows, and link and lever means connecting the rear end of said auxiliary bow with the other of said two previously mentioned bows.

22. In a top for vehicles and the like, the combination of a support pivotally attached to the body of the vehicle and adapted to incline relatively thereto in the open position of the top, a supplemental bow pivotally attached to said support and inclining relatively thereto so as to lie with its upper end substantially directly over the point of attachment of said support to the vehicle body when the top is thus open, a horizontally extending articulated auxiliary bow pivotally attached to one of the two previously mentioned bows, said auxiliary bow having a lever-extension, and a link connecting such extension with the other of said two previously mentioned bows.

Signed by me, this 5th day of May, 1914.

CHARLES R. ALLEN.